(12) United States Patent
Ruottu

(10) Patent No.: US 6,200,534 B1
(45) Date of Patent: *Mar. 13, 2001

(54) APPARATUS FOR CHEMICAL AND PHYSICAL PROCESSES

(75) Inventor: Seppo Ruottu, Karhula (FI)

(73) Assignee: Fortum Oil and Gas Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,816

(22) Filed: Aug. 29, 1997

(30) Foreign Application Priority Data

Aug. 30, 1996 (FI) ...................................................... 963403

(51) Int. Cl.⁷ ................ B01J 8/18; F27B 15/00; F27B 15/08
(52) U.S. Cl. ................ 422/145; 422/139; 422/141; 422/147
(58) Field of Search ................ 422/139, 140, 422/141, 142, 143, 144, 145, 205, 147

(56) References Cited

U.S. PATENT DOCUMENTS

| | | | |
|---|---|---|---|
| 2,358,497 | 9/1944 | Engloff | 208/158 |
| 2,464,812 | * 3/1949 | Johnson | 208/147 |
| 2,514,288 | 7/1950 | Nicholson | 208/147 |
| 2,525,925 | 10/1950 | Marshall | 208/147 |
| 2,919,241 | * 12/1959 | Kelly et al. | 208/80 |
| 4,090,956 | * 5/1978 | Benzon | 209/732 |
| 4,152,393 | 5/1979 | Callahan et al. | 422/144 |
| 4,486,207 | * 12/1984 | Baillie | 55/455 |
| 4,919,909 | * 4/1990 | Lesur et al. | 423/360 |

FOREIGN PATENT DOCUMENTS

| | | |
|---|---|---|
| 3 225838A1 | 1/1984 | (DE). |
| 2118702 | 11/1983 | (GB). |
| 2240285 | 7/1991 | (GB). |
| 4 14373 | 7/1980 | (SE). |
| 9 408194 | 4/1994 | (WO). |
| 9 527019 | 10/1995 | (WO). |

* cited by examiner

Primary Examiner—Shrive Beck
Assistant Examiner—Alexa A. Doroshenk

(57) ABSTRACT

A first reactor includes a circulating fluidized-bed rector with a reaction space of an axially annular cross section, and the second reactor includes a circulating fluidized-bed reactor surrounding the first reactor in a symmetrically concentric fashion, whereby also the second reactor has a reaction space of an axially annular cross section. The construction according to the invention makes it possible to implement also large equipment with a small height-to-diameter ratio, whereby the footprint/space requirements of the equipment are minimized and problems associated with thermal expansion are reduced essentially.

17 Claims, 1 Drawing Sheet

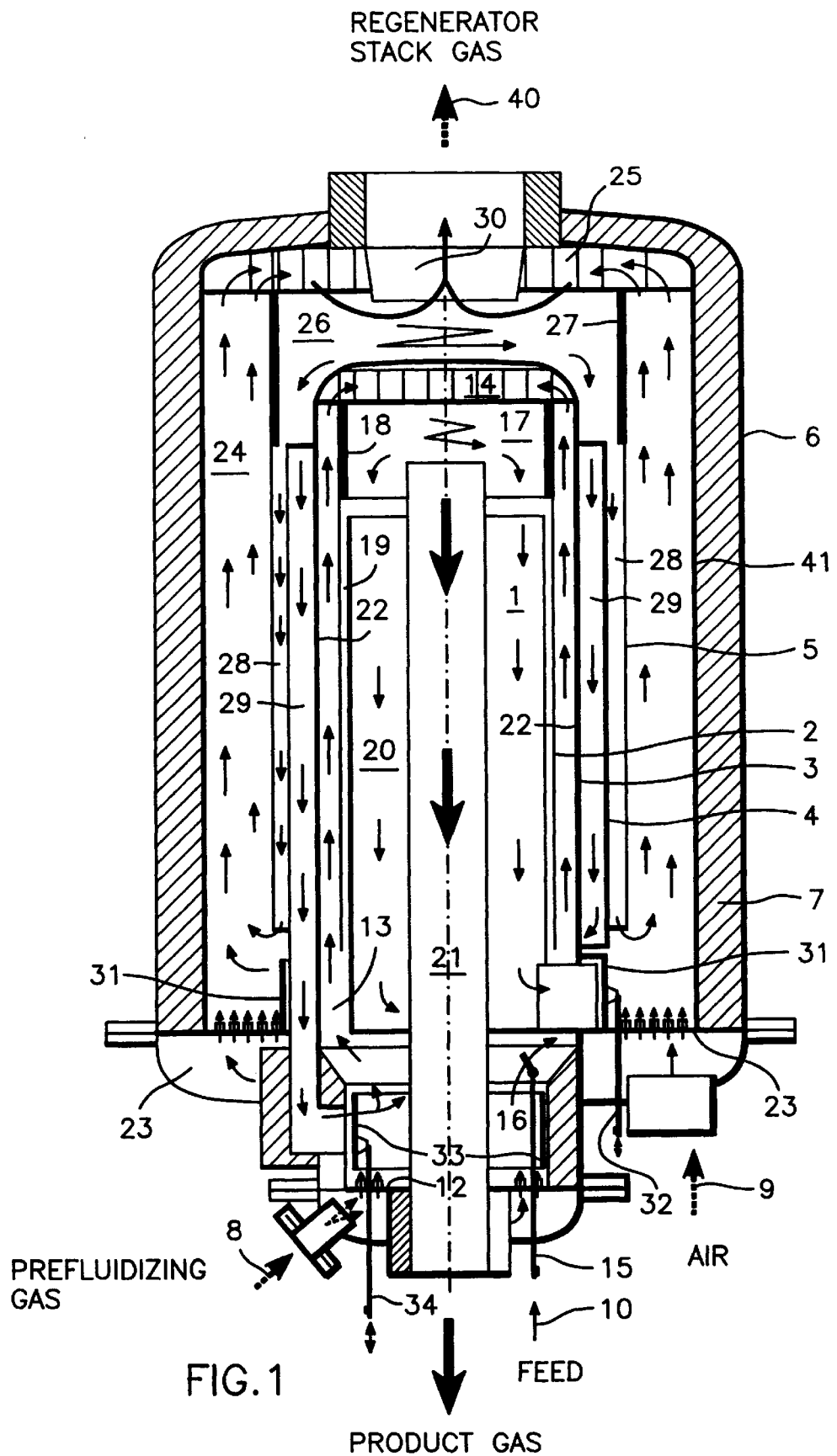

APPARATUS FOR CHEMICAL AND PHYSICAL PROCESSES

BACKGROUND OF THE INVENTION

1. Field of the Invention

The invention relates to an apparatus according to the preamble of claim 1 for carrying out chemical and physical processes comprised of two separate unit processes using a particulate matter medium.

2. Background of the Related Art

Generally, such an apparatus includes a reactor for performing the first unit process, a regenerator for performing the second unit process and a communicating channel arranged between said reactor and said regenerator for the transfer of said particulate matter medium from the reactor to the regenerator as well as a return channel thereinbetween for returning regenerated particulate matter medium from the regenerator back to the reactor for reuse.

A great number of processes in the chemical and energy industries comprise two separate catalytic, noncatalytic or physical unit processes. Here, in chemical processing, the first unit process is carried out in order to accomplish a desired chemical reaction and the second unit process serves for the regeneration of the inert or catalytic particulate matter used in the process. In this context, the term regeneration may simply refer to reheating of the solids, or in the case the particulate matter is a catalyst, to the reactivation thereof by means of heating. Correspondingly, in physical processes the solids medium can be used for transfer of heat or desired products from one unit process to another. Frequently, the chemical and physical processes are linked each other; in catalytic cracking, for instance, a chemical reaction occurs both in the reactor and the regenerator, complemented with physical processes (transfer of heat and material between the units).

In fact. heat exchange from one gas stream to another is one of the most crucial tasks in the process and energy generation technologies. Today, two heat exchanger types are in general use, respectively called recuperative or regenerative heat exchangers depending on the operating principle.

In recuperative heat exchangers, heat energy is transferred through a nonpermeable wall separating the flows from each other. In the basic type of recuperator, heat energy is directly conducted via the wall from one flow of medium to another flow. A specific subgroup of recuperators comprises so-called intermediate circulation recuperators, in which a heat-transferring medium is circulated between two recuperative heat exchangers. Such heat exchangers are employed in, e.g., nuclear power plants in which it is necessary to assure that the high-activity flow cannot mix with the secondary circulation in accident situations.

Another exemplifying group of intermediate-circulation recuperators is formed by fluidized-bed boilers equipped with superheaters placed external to the combustion chamber; in these boilers the sand heated in the combustion chamber is cooled in a separate fluidized-bed superheater. An example of such heat exchangers is described, e.g., in U.S. Pat. No. 4,552,203. The chief limitations of recuperative heat exchangers are related to the erosion, corrosion and temperature endurance of the heat exchanger vessel wall materials. Today, no practical wall materials are available for conditions exhibiting high mechanical or chemical stresses. The highest allowable temperature in recuperators is often limited by the strength properties of the wall material. Moreover, recuperators are expensive and restricted in their control possibilities. Good controllability can, however, be achieved in intermediate-circulation recuperators.

In regenerative heat exchangers, thermal energy is transferred by way of allowing the heated heat-transferring medium to release energy into a colder flow under a direct contact therewith and then reheating the cooled heat-transferring medium again under a direct contact in a hotter flow. Regenerative heat exchangers are further divided into cyclically and continuously operating types on the basis of their operating principle.

In cyclically operating regenerators, the hotter and the cooler flow are cyclically passed via a single solid structure which thus alternatingly stores and releases thermal energy. The batch-heated rock stove of a sauna is without doubt the oldest application of the cyclically operated regenerator.

In continuously operating regenerators, the heat-storing medium is continually recirculated from one flow to another. The best-known type of continuously operating regenerator is the Ljungström regenerator in which a rotating heat exchanger disc of cellular structure transfers thermal energy from one material flow to another. This regenerator type has been modified for different applications such as, for example, the air-conditioning regenerator which additionally provides moisture transfer on surfaces coated with lithium chloride paste.

Besides the regenerator types of the abovedescribed kinds with a fixed-shape, contiguous heat-transferring element, regenerators based on granular heat transfer media are known in the art.

Several different types of regenerators are known having the granular heat transfer medium in the fixed-bed state, and the heat transfer medium is then mechanically recirculated between the layers of the bed.

German Pat. No. DE 3,225,838 employs a granulated heat transfer medium (e.g., porcelain pellets) for heat transfer between the gas flows. The granular bed material is fluidized, whereby the pellets remain clean and clogging of the heat exchanger is avoided. U.S. Pat. No. 4,307,773 discloses another type of process and apparatus in which a regenerator system based on bubbling fluidized bed layers is employed for heat recovery from the gases of a hot contaminated fluid stream.

Besides the above-described patents, different types of regenerators are known based on alternate heating/cooling of granular material in separate, parallel. bubbling fluidized bed layers. UK Pat. No. 2,118,702 discloses a regenerator based on downward dribbling fixed bed layers.

A central issue of regenerators based on a fixed heat transfer element and fixed layered zones of granular material is how to keep them clean. Also the prevention of flows from mixing with each other causes sealing problems in these regenerators. Furthermore, the temperature differentials formed into the heat transfer material impose mechanical stresses which limit the life of the heat transfer element or material. A drawback of the layered fixed bed regenerator is the channelling of flows in the fixed bed layers. Moreover, the fixed bed layers obviously develop inevitable temperature gradients in the direction of the flow and the temperature of a layer is difficult to control.

One of the most generally used processes based on a fluidized-bed reactor system running two separate unit processes is the FCC equipment, which is intended for catalytic cracking of hydrocarbons, comprising chiefly a riser tube (reactor) operated in the fast fluidization flow state, cyclone separators of the catalyst and reaction product operated in a diluted suspension phase and a large-volume regenerator operated in the fluidized-bed state. An example of FCC equipment is represented by the embodiment illustrated in U.S. patent publication 4,957,617.

Other applications utilizing catalytic fluidized-bed reactors are, e.g.:
catalytic reforming,
preparation of phthalic acid anhydride or maleic acid anhydride,
oxidative dimerization of methane,
Fischer-Tropsch synthesis,
dehydrogenation,
chlorination and bromination of methane, ethane and similar alkanes, and
conversion of methanol into olefins or gasoline.

Noncatalytic processes using fluidized-bed reactors are, e.g.:
thermal cracking,
catalyst regeneration, and
gasification processes.

Suitable physical processes are, e.g.:
drying,
heat exchange between two gases, and
adsorption.

In fluidized bed reactors, the flow velocities must be adapted according to the physical properties of the heat transfer material employed, and the control range of the regenerator is limited between the minimum fluidization velocity and the pneumatic transportation velocity. In practice this means that the heat transfer medium of the regenerator must have a coarse granular size, or alternatively, the flow velocities employed must be kept low. Furthermore. the recirculation of the heat transfer medium between the fluidized bed layers in a manner avoiding excessive mixing of the separated flows is problematic. This problem is accentuated at high pressure differentials between the heat-transferring flows. Herein, it is generally necessary to use mechanical valves whose wear and temperature limitations eliminate an essential portion of the benefits of this regenerator type. Prior-art fluidized-bed and fixed-bed regenerators require the use of a mechanical or pneumatic transfer arrangement for recycling the heat transfer medium from the lower unit to the upper unit. In terms of equipment and process technology, such transfer arrangements are almost impossible to implement.

Essential improvements to the above-described shortcomings are provided by the embodiment described in FI Pat. No. 924,438, in which the equipment comprises two or a greater number of parallel connected circulating fluidized bed reactors later in the text called the "CS" reactor. Of chemical processes, the catalytic cracking or dehydrogenation process among others can be constructed on an equipment configuration disclosed in the patent. However, the technical implementation of these apparatuses involves certain problems to be described in more detail below that prevent full utilization of these reactor apparatuses unless their limitations can be overcome. One of the most difficult problems herein relates to the long horizontal transfer distances of the circulating solids between the CS reactors that compel the constructions of large equipment to have a clumsy height.

Accordingly, if a number of CS reactors are arranged adjacent to each other, it is practically impossible to achieve a stable circulation of the solids without making the CS reactors inconveniently high. Also the design of communicating channels for the heat transfer medium poses construction problems. Further, the footprint required by adjacently located CS reactors will become intolerably large.

SUMMARY OF THE INVENTION

It is an object of the present invention to overcome the drawbacks of the above-described prior-art technology and to provide an entirely novel type of apparatus for carrying out physical and chemical processes.

The goal of the invention is achieved by implementing the apparatus in the form of two concentrically adapted reactors of which the inner acts as the reactor and outer as the regenerator. Thence, the reaction spaces of both reactors comprise an intershell riser space remaining between two concentrically located envelope surfaces having a cylindrical or partially conical shape, whereby intershell riser spaces have an at least essentially axially annular cross section.

The chief advantages of the invention are listed:
1. The symmetrically concentric construction of the CS reactors in the apparatus minimizes the horizontal transfer distances of the heat transfer medium also in large equipment.
2. The construction according to the invention makes it possible to implement also large equipment with a small height-to-diameter ratio.
3. The footprint/space requirements of the equipment are minimized.
4. The thermal expansion problems of the equipment are essentially reduced.
5. The equipment forms a compact, sturdy and easy-to-install entity.
6. The equipment can be provided with a number of inlet/outlet nozzles for the heat transfer medium, whereby the horizontal solids mixing in the CS reactor of the regenerator is easier to control. This feature may be of substantial importance in applications where some of the CS reactors of the apparatus are used for running physical or chemical reactions.

According to the concept of the present inventions two circulating fluidized-bed reactors are built symmetrically concentric, whereby the riser channels of the upward flowing suspended catalyst have an essentially axially annular cross section. The riser channels may be divided into segmental channels by baffles. Since the reactors have an at least essentially upright longitudinal axis, any reference in the text to the cross section of the reactor must be understood to concern the horizontal cross section unless otherwise specified. The riser channels perform as the chemical or physical reactor spaces of the equipment. An essential property and consequence of the symmetrical construction is that also the cyclone connected to the riser has an axially symmetrical structure.

While the invention is principally intended for use in the chemical processes of oil refinery and petrochemical industries, a plurality of its benefits can also be exploited in many other chemical and physical processes such as the drying processes of foodstuff industry and the heat exchange processes of metal and ceramic industries.

Construction

The greatest advantage of the present invention is that it facilitates construction of more compact apparatuses than is possible by using equipment layouts based on the combination of separate apparatuses, thus offering an essentially smaller footprint and easier installation. A further benefit of the compact construction is that the supporting and foundation of the apparatus will be simpler and cost less.

Insulation linings are chiefly required in the reactors of the chemical industry for keeping the temperature of the pressure shell below a certain limit dictated by the construction material. In the design of linings, typically the law of scaling economics is obeyed: less lining per produced amount of end product is required if the equipment size is increased. This rule generally results in the on-site construction of a single apparatus of maximum required capacity, whereby undisturbed function of the unit often becomes crucial to the entire operation of the plant. By contrast, the reactor apparatus according to the invention has a smaller external surface area in regard to equipment of comparable capacity, which means a reduced need for lining. Owing to the smaller lining material mass, the novel apparatus can have a lighter construction; even so that the apparatuses can be designed portable with a modular construction optimized for series-production manufacture and workshop reconditioning, thus being suitable for parallel connection (e.g., 2–6 pcs.) in the field to provide the required process flow capacity. Then, a reactor unit in the need for reconditioning may be disconnected from the layout and transported to the workshop for reconditioning. Hence. an essential improvement is offered over the prior art in, e.g, FCC units, whose equipment maintenance must generally be synchronized with other prescheduled shutdowns of the process plant.

The amount of heat losses in process equipment is determined by the external surface area of the apparatus as economic and structural design factors do not permit an increase of the thermal isolation thickness past a certain practical limit. Due to its compact structure, the novel reactor construction according to the invention achieves essentially reduced heat losses over conventional equipment.

Furthermore, thermal expansion of communicating pipes and elements of equipment operating at different temperatures causes design problems that often must be solved by resorting to expensive bellows compensators and other devices. The embodiment according to the invention offers a superior approach to thermal expansion: most of the elements in the apparatus can freely expand both axially and radially.

Flow dynamics

Frequently, the plant equipment layout and dimensions are dictated by the transfer distances of particulate matter from one apparatus to another. The embodiment according to the invention offers the benefit that the horizontal transfer distances between the reactor proper and the regenerator can be kept short, thus permitting low height of the equipment and disposing with any complicated mechanical and pneumatic transfer systems. Moreover, the solids are easy to distribute over the entire area of the axially annular cross section by virtue of the concentrically symmetrical arrangement of units in the construction according to the invention.

Example

When the chemical reactions concerned involve catalytic cracking or dehydrogenation, the reactor and regenerator can have a construction based on risers of axially annular cross section described in a parallel patent application filed by the inventors, and the process itself may be based on the equipment configuration disclosed in FI Pat. No. 941,528, thereby containing all the essential elements discussed therein. By arranging the units in a concentrically symmetrical manner according to the present invention, significant benefits will be gained in terms of construction and flow dynamics. The present embodiment offers improved control of the contact time between the catalyst and the gaseous feed; the oil or gas feed can be distributed uniformly over the reactor cross section; and no significant problems are posed by the thermal expansion movements of the units, because the concentrically mounted units can move in an unobstructed manner with respect to each other. In a preferred embodiment of the invention having the reactor optimized for catalytic cracking, the reactor and the regenerator are concentrically mounted, whereby the solids, or the catalyst, is circulated from the first reaction space to the other via a channel of axially annular cross section. Herein, the axially annular channel is connected to another reaction space (regenerator) of corresponding axially annular cross section surrounding the first reaction space. The return channel from the second reaction space to the first reaction space is also advantageously formed by a channel of axially annular cross section. The particulate matter flows into the reaction space via the solids inlet port and will be mixed in the axially annular riser channel of the reactor with prefluidizing gas flowing from below upward in the riser carrying therewith the solids up to the level of feed spray nozzles. Here, the gas or liquid feed atomized from the spray nozzles into small droplets vaporizes under contact with the hot solids flow. Due to the feed vaporization, the solids flow velocity will increase. As the flow velocity is appreciably higher than the minimum fluidiation velocity, the solids will follow the gas flow, however, at a velocity slightly lower than the gas flow velocity. A separating unit formed by a multiport cyclone of the reactor which is placed to the upper end of the reaction space performs separation of particulate matter from the solids suspension. From the cyclone, the solids are passed after regeneration back to the reactor via the axially annular downward return leg. The reaction product gases are removed via the central tube of the cyclone.

Further scope of applicability of the present invention will become apparent from the detailed description given hereinafter. However it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIG. 1 is a schematic side view of an apparatus according to the present invention.

DETAILED DESCRIPTION OF THE INVENTION

An apparatus according to the novel construction comprises an inner reactor of axially annular riser cross section and an outer regenerator in which contaminated catalyst particles or cooled heat transfer medium solids can be regenerated and returned back to the process.

In the following description, the circulating solids are denoted by abbreviation "CS" and the example process is catalytic cracking using a liquid hydrocarbon as the feed.

Referring to FIG. 1, a preferred embodiment of the apparatus according to the invention comprises two concentrically adapted cylindrical CS reactors, separated by an intermediate shell 22 from each other, of which the inner will later be called the "reactor" and the outer the "regenerator".

The reactor unit is made from three concentrically mounted, essentially cylindrical tubes 1, 2 and 3, whose intertube spaces form spaces 20, 19 and 13 of axially annular cross section. The tubes may be made from steel or an equivalent alloy. Among these, the desired reaction is carried out in the axially annual riser space 13. The tubes are mounted with their longitudinal axes aligned concentrically vertical. Above the axially annular space 13, as a continuation of tubes 2 and 3, is mounted a multiport cyclone 17 having louvered vanes 14 fixed to its outer wall. The cyclone is provided with a center tube 21 for removal of the product gas, while transfer channels 19 and 20 are provided in the inner space of tubes 2 and 1 for removal of the solids separated from the gaseous phase in the cyclone.

The regenerator unit comprises three concentrically mounted, essentially cylindrical tubes 4, 5 and 41, whose intertube spaces form spaces 29, 28 and 24 of axially annular cross section. Among these, catalyst regeneration is carried out in the space 24. From inside, a pressure shell 6 is lined with an insulating material layer 7 in order to maintain the shell temperature at a reasonable level for shell strength. In a similar fashion as in the reactor, above the axially annular space 24 is mounted a multiport cyclone 26, whose vanes 25 are attached either to the cylindrical tube 5 or the pressure shell 6. The cyclone is provided with a center tube 30 for the removal of the stack gas formed in the regenerator, while spaces 28 and 29 are provided by means of tubes 5 and 6 for removal of the catalytic solids separated from the gas phase in the cyclone.

The fluidization gas flow of the reactor is denoted in the diagram by reference numeral 8. The gas flow 8 enters the reaction space through a fluidization bottom 12 above which it is first mixed with the returned catalyst entering via a space 20 via a valve 31, and then higher in the reactor riser, with the feed flow 10 injected via spray nozzles 15 of feed pipes 16, whereby the feed is vaporized in the reaction space. The mixed gas flow 8 and feed flow 10 move in a gaseous phase along the axially annular space 13 simultaneously carrying the entrained catalyst therewith into the vanes 14 of the reactor cyclone. The catalyst releases heat into the feed vaporization and the reaction occurring in the space 13, whereby its temperature falls. From the vanes 14, the gas and entrained catalytic solids enter tangentially the interior chamber of the inner reactor multipart cyclone 17, where the catalytic solids are separated by impinging on cyclone inner wall 18 and falling into spaces 19 and 20. When required, a portion of the catalytic solids can be returned as an overflow back to the reactor bottom section via space 19. While space 19 is not essential to the function of the apparatus, it may in some cases be advantageous to the reaction. In the space 20, the catalytic solids dribble downward in a dense phase, whereby the mixing of the gas flows between the reactor and the regenerator via the space 20 will be inhibited. The gas flow 8 entering the reactor cyclone exits the reactor via the center tube 21 of the inner cyclone. The catalytic solids flow from the reactor into the regenerator is controlled by means of a valve 31 equipped with a cylindrical control element, which is arranged mechanically movable by means of bars 32.

The regenerator is adapted about the reactor so that these units are separated from each other by space 29 filled with catalytic solids in a dense phase. In a similar fashion with the reactor, the regenerator is located in the intershell riser space remaining between two cylindrical envelope surfaces formed by the apparatus shell and the reactor tube mounted inside the shell. Between said reactor tube and said outer cylindrical shell structure of the reactor is further mounted a cylindrical wall to provide said space 29. An oxygen-containing gas flow 9 enters the regenerator via a fluidizing distributor bottom 23 and rises in the axially annular space 24 simultaneously therewith carrying the catalytic solids into the vanes 25 of the regenerator cyclone. In the regenerator, coke possibly accumulated on the surface of the catalytic solids and organic compounds penetrated in the pores thereof are oxidized, that is, burned in the space 24. whereby the catalyst temperature is elevated. The chamber of regenerator multipart cyclone 26 is located above the reactor proper. In the cyclone 26, the chamber of solids are separated by impinging on the cyclone wall 27 and subsequently fall into spaces 28 and 29. The space 29 passes the catalytic solids back to the reactor. That excess portion of the solids which fails to enter the space will fall back to the regenerator bottom section as an overflow via the space 28. The catalyst or similar particulate matter is advantageously kept in a fluidized state during its passage in the internal return channel, whereby a control valve is redundant. The stack gas 40 of the regenerator is removed via the central tube 30 of the regenerator cyclone. The solids dribbling slowly downward in space 29 in a dense phase prevent communication between the gas spaces of the reactor and the regenerator. The solids flow rate from the regenerator to the reactor is controlled by moving the cylindrical control element of a valve 33 mechanically via bars 34 connected thereto.

For tests simulating the catalytic cracking process discussed in FI Pat. Appl. 941,528, a so-called cold model was constructed having two circulating fluidized-bed reactors built in a concentrically enclosing manner into a single unit. The outer diameter of regenerator was 465 mm with an inner diameter of 365 mm. while the reactor dimensions were 360 mm OD and 300 mm ID. The apparatus was operated by increasing the catalyst circulation rate up to 2 kg/s, which is a sufficient amount for a pilot process in which the oil feed rate is 500 kg/h and the catalyst-to-oil ratio is 15. Under operation, the regenerator cyclone inlet flow velocity was 5.6 m/s and the cross-sectional mass flow rate of the catalyst was over 200 kg/m$^2$s. In these operating conditions, no detectable carry-over of the catalyst via the stack gas discharge nozzle of the cyclones was noticed and the cooperation of the system was unproblematic.

Obviously, the details of the discussed embodiment may be varied without departing from the scope and spirit of the invention. For instance, the inner reactor may be enclosed by a number of concentrically symmetrical outer reactors having a structure similar to that of the above-described regenerator.

What is claimed is:

1. An apparatus for carrying out physical and chemical processes comprising two separate unit processes using a particulate matter medium, wherein the second unit process serves for regeneration of the particulate matter contaminated in the first unit process, said apparatus comprising:

a first reactor for carrying out the first unit reaction;

a second reactor for carrying out the second unit reaction;

a first transfer channel facilitating the transfer of contaminated particulate matter from the first reactor to the second reactor, said first transfer channel being between the first reactor and the second reactor;

a second transfer channel facilitating the transfer of regenerated particulate matter from the second reactor to the first reactor; and a multi-inlet cyclone disposed along an upper end of each reactor and having at least two separate inlets, the multi-inlet cyclone of each reactor facilitating exuding a gaseous substance to an outside environment and separating a solid material contained therein, wherein the first reactor includes a first circulating fluidized-bed reactor with a reaction space having an axially annular cross section, the second reactor includes a second circulating fluidized-bed reactor surrounding the first reactor in a symmetrically concentric fashion, whereby the second reactor has a reaction space having an axially annular cross section; and wherein the reaction space of said first reactor includes an intershell riser space formed between two concentrically located cylindrical and conical envelope surfaces and the first transfer channel is formed inside the intershell riser space and interfaces with the multi-inlet cyclone disposed along the upper end of the first reactor.

2. An apparatus as defined in claim 1, wherein said reaction space of each reactor is divided into parallel flow segments.

3. An apparatus as defined in claim 2, wherein said parallel flow segments are formed by spanning between said two concentrically mounted cylindrical envelope surfaces which are aligned parallel to the longitudinal axis of the reaction.

4. An apparatus as defined in claim 2, wherein the reaction space of essentially axially annual cross section is formed by parallel reactor tubes equidistantly spaced in a circular fashion.

5. An apparatus as defined in claim 1, wherein two concentrically mounted cylindrical envelope surfaces of said reactors are spanned tube walls running in a spiraling manner along the longitudinal axis of the reactor riser.

6. An apparatus as defined in claim 1, wherein said first reactor and said second reactor have an at least essentially upright longitudinal axis.

7. An apparatus as defined in claim 1, wherein said first reactor and said second reactor have a riser flow cross section varying as a function of the riser height.

8. An apparatus as defined in claim 1, wherein vanes of the cyclone are adapted in a circularly louvered fashion about the perimeter of a cyclone chamber of said multi-inlet cyclone, so as to act as a louver capable of forming a plurality of parallel inlet channels for an entering gas flow.

9. An apparatus as defined in claim 1, wherein a first solids transfer channel comprises a channel of an axially annular cross section formed by the intershell riser space remaining between two cylindrical or partially conical envelope surfaces.

10. The apparatus as defined in claim 1, wherein a portion of said first reactor is defined by at least two parallel longitudinal extending tubes arranged in a concentric and cylindrical manner around a center tube.

11. The apparatus as defined by claim 10, wherein said center tube is connected to the multi-port cyclone of said first reactor, said center tube extending along a longitudinal interior portion of said first reactor and being providing for further facilitating the expelling said gaseous substance.

12. The apparatus as defined in claim 1, wherein said first transfer channel includes at least two longitudinally extending tubes aligned along an interior portion of the apparatus, at least one of said at least two tubes interfacing with said multi-port cyclone.

13. The apparatus as defined in claim 1, wherein said second transfer channel includes at least two longitudinally extending tubes aligned along an interior portion of the apparatus, at least one of said two tubes interfacing with another of said multi-port cyclone.

14. The apparatus as defined in claim 1, wherein the multi-port cyclone of said first reactor defines an upper portion of the first reactor and the multi-port cyclone of said second reactor defines an upper portion of the second reactor, whereby the multi-port cyclones of said first and second reactors are aligned essentially parallel to each other and the top of the multi-port cyclone of said first reactor defines the bottom of the multi-port cyclone of said second reactor.

15. The apparatus as defined by claim 1, wherein gas exhausts are defined at upper and lower ends of the apparatus, the upper end exhaust expunging regenerator gas and the lower end exhaust expunging product gas.

16. The apparatus as defined by claim 1, wherein said multi-inlet cyclone has a plurality of inlets defined on an outside surface thereof.

17. An apparatus for carrying out physical and chemical processes comprising two separate unit processes using a particulate matter medium, wherein the second unit process serves for regeneration of the particulate matter contaminated in the first unit process, said apparatus comprising:

a first reactor for carrying out the first unit reaction;

a second reactor for carrying out the second unit reaction;

a first transfer channel facilitating the transfer of contaminated particulate matter from the first reactor to the second reactor, said first transfer channel being between the first reactor and the second reactor;

a second transfer channel facilitating the transfer of regenerated particulate matter from the second reactor to the first reactor; and a multi-inlet cyclone disposed along an upper end of each reactor and having at least two separate inlets, the multi-inlet cyclone of each reactor facilitating exuding a gaseous substance to an outside environment and separating a solid material contained therein, vanes of the cyclone are adapted in a circularly louvered fashion about the perimeter of a cyclone chamber of said multi-inlet cyclone, so as to act as a louver capable of forming a plurality of parallel inlet channels for an entering gas flow, wherein the first reactor includes a first circulating fluidized-bed reactor with a reaction space having an axially annular cross section, the second reactor includes a second circulating fluidized-bed reactor surrounding the first reactor in a symmetrically concentric fashion, whereby the second reactor has a reaction space having an axially annular cross section; and wherein the reaction space of said first reactor includes an intershell riser space formed between two concentrically located cylindrical and conical envelope surfaces, and the first transfer channel is formed inside the intershell riser space and interfaces with the multi-inlet cyclone disposed along the upper end of the first reactor.

* * * * *